(12) United States Patent
Dai et al.

(10) Patent No.: US 10,165,557 B2
(45) Date of Patent: Dec. 25, 2018

(54) DATA TRANSMISSION METHOD AND DEVICE, AND RELATED COMPUTER STORAGE MEDIUM

(71) Applicant: ZTE CORPORATION, Shenzhen, Guangdong Province (CN)

(72) Inventors: Bo Dai, Shenzhen (CN); Chunli Liang, Shenzhen (CN); Weiwei Yang, Shenzhen (CN); YuNgok Li, Shenzhen (CN); Guanghui Yu, Shenzhen (CN); Liujun Hu, Shenzhen (CN); Shuqiang Xia, Shenzhen (CN)

(73) Assignee: XI'AN ZHONGXING NEW SOFTWARE CO., LTD, Shaanxi (CN)

( * ) Notice: Subject to any disclaimer, the term of this patent is extended or adjusted under 35 U.S.C. 154(b) by 98 days.

(21) Appl. No.: 15/312,511

(22) PCT Filed: Oct. 16, 2014

(86) PCT No.: PCT/CN2014/088779
§ 371 (c)(1),
(2) Date: Nov. 18, 2016

(87) PCT Pub. No.: WO2015/176476
PCT Pub. Date: Nov. 26, 2015

(65) Prior Publication Data
US 2017/0094655 A1  Mar. 30, 2017

(30) Foreign Application Priority Data

May 19, 2014  (CN) .......................... 2014 1 0211457

(51) Int. Cl.
*H04W 72/04* (2009.01)
*H04L 5/14* (2006.01)
(Continued)

(52) U.S. Cl.
CPC ........... *H04W 72/0413* (2013.01); *H04L 5/14* (2013.01); *H04L 27/2601* (2013.01);
(Continued)

(58) Field of Classification Search
None
See application file for complete search history.

(56) References Cited

U.S. PATENT DOCUMENTS

| 2011/0096717 | A1 | 4/2011 | Kim et al. |
| 2011/0116437 | A1* | 5/2011 | Chen .................... H04B 7/0689 370/312 |

(Continued)

FOREIGN PATENT DOCUMENTS

| CN | 101588201 A1 | 11/2009 |
| CN | 102299765 A1 | 12/2011 |

(Continued)

OTHER PUBLICATIONS

Extended European Search Report dated Feb. 21, 2017 for European Patent Application No. EP14892311.3.
(Continued)

*Primary Examiner* — Brian S Roberts
(74) *Attorney, Agent, or Firm* — Plumsea Law Group, LLC

(57) ABSTRACT

Disclosed is a data transmission method, including: obtaining subframe types of subframes for bearing data transmission; transmitting data on the subframes according to the subframe types; when the subframe types includes a first predefined subframe type and a first conventional subframe type, configuring a different value for an element in a transmission structure respectively used by the first predefined subframe type and the first conventional subframe type; when the subframe types includes a second predefined subframe type and a second conventional subframe type, (Continued)

configuring the second conventional subframe to be an uplink subframe or downlink subframe within preset time; configuring the second predefined subframe to switch between uplink and downlink within the preset time; and when the subframe types includes a third predefined subframe type and a third conventional subframe type, configuring maximum transmission power of the third predefined subframe to be less than that of the third conventional subframe.

20 Claims, 7 Drawing Sheets

(51) Int. Cl.
| | | |
|---|---|---|
| H04L 27/26 | (2006.01) | |
| H04W 52/28 | (2009.01) | |
| H04L 5/00 | (2006.01) | |
| H04W 52/24 | (2009.01) | |
| H04W 52/36 | (2009.01) | |

(52) U.S. Cl.
CPC ...... *H04L 27/2602* (2013.01); *H04L 27/2607* (2013.01); *H04W 52/28* (2013.01); *H04W 72/042* (2013.01); *H04W 72/0446* (2013.01); *H04W 72/0453* (2013.01); *H04L 5/003* (2013.01); *H04L 5/0051* (2013.01); *H04W 52/242* (2013.01); *H04W 52/243* (2013.01); *H04W 52/367* (2013.01)

(56) References Cited

U.S. PATENT DOCUMENTS

| | | | |
|---|---|---|---|
| 2011/0275363 A1* | 11/2011 | Kwon | H04L 5/00 455/422.1 |
| 2013/0188533 A1 | 7/2013 | He et al. | |
| 2013/0301545 A1 | 11/2013 | Wang et al. | |
| 2013/0315114 A1 | 11/2013 | Seo et al. | |
| 2014/0092827 A1* | 4/2014 | Jongren | H04L 5/0053 370/329 |

FOREIGN PATENT DOCUMENTS

| | | |
|---|---|---|
| CN | 102572920 A1 | 7/2012 |
| CN | 102740477 A1 | 10/2012 |
| WO | 2014/053885 A1 | 4/2014 |

OTHER PUBLICATIONS

International Search Report and Written Opinion dated Mar. 4, 2015 for PCT Application No. PCT/CN2014/088779.

* cited by examiner

FDD uplink frequency transmission band | UF1 | UF2 | UF3 | UF4 | UF5 | UF6 | UF7 | UF8 | UF9 | UF10

FDD downlink frequency transmission band | DF1 | DF2 | DF3 | DF4 | DF5 | DF6 | DF7 | DF8 | DF9 | DF10

DATA TRANSMISSION METHOD AND DEVICE, AND RELATED COMPUTER STORAGE MEDIUM

CROSS-REFERENCE TO RELATED APPLICATION(S)

This application is the U.S. National Phase application of PCT application number PCT/CN2014/088779 having a PCT filing date of Oct. 16, 2014, which claims priority of Chinese patent application 201410211457.7 filed on May 19, 2014, the disclosures of which are hereby incorporated by reference.

TECHNICAL FIELD

The present document relates to data transmission technologies, and more particularly, to a data transmission method, device and related computer storage media.

BACKGROUND

Frequency Division Duplexing (FDD) and Time Division Duplexing (TDD) are widely used in communication systems. Herein, the FDD needs to use the uplink and downlink frequencies in pairs to take full advantage of uplink and downlink spectrums when supporting symmetrical services in which the voice service is a representative. However, in asymmetric services, in which the IP service is a representative, such as online video, software download, webpage browsing whose downlink speed is the key factor, the spectrum utilization is greatly reduced, the uplink spectrum resources are not used, and there is a phenomenon of the waste of uplink spectrum resources, therefore, how to effectively improve the spectrum utilization has become an urgent problem to be solved.

SUMMARY

In order to solve the existing technical problems, the embodiment of the present document provides a data transmission method, a device and a computer storage medium, which can improve the frequency spectral efficiency to increase the system throughput.

The technical solution of the embodiment of the present document is realized as follows:

An embodiment of the present document provides a data transmission method, applied to a first transmission node, herein the method includes:

obtaining subframe types of subframes for bearing data transmission;

a first transmission node transmitting data on the subframes according to the subframe types;

herein, the subframe types at least include a conventional subframe type and a predefined subframe type, and configuring a conventional subframe corresponding to the conventional subframe type and a predefined subframe corresponding to the predefined subframe type through at least one of the following:

when the subframe types at least include a first predefined subframe type and a first conventional subframe type, configuring a different value for an element in a transmission structure respectively used by the first predefined subframe and the first conventional subframe; herein the element includes one of the following: a transmission mode of the data, a cyclic prefix length, a number of orthogonal frequency division multiplexing, OFDM, symbols, subcarrier spacing, and a resource unit of the data transmission;

when the subframe types at least include a second predefined subframe type and a second conventional subframe type, configuring the second conventional subframe to be an uplink subframe or a downlink subframe within a preset time; configuring the second predefined subframe to switch between an uplink and a downlink within the preset time;

when the subframe types at least include a third predefined subframe type and a third conventional subframe type, configuring maximum transmission power of the third predefined subframe to be less than maximum transmission power of the third conventional subframe.

In the above-mentioned solution, before obtaining subframe types of subframes for bearing data transmission, the method further includes:

obtaining relevant information related to the predefined subframe, and/or frequency domain location information of a physical control channel of at least one fourth transmission node, to make the first transmission node to configure the predefined subframe.

In the above solution, the relevant information includes at least one of the following:

time domain information of the predefined subframe, frequency domain information of the predefined subframe, information of a data type transmitted on the predefined subframe, switch information of a cell in which the fourth transmission node is located, information of transmission power used for transmitting data on the predefined subframe, interference information interfering the predefined subframe, the data transmission mode used by the predefined subframe, a cyclic prefix length, a number of OFDM symbols included in the predefined subframe, subcarrier spacing, and a resource unit of the data transmission.

In the abovementioned solution, before a first transmission node transmitting data on the subframes according to the subframe types, the method further includes:

the first transmission node transmitting configured configuration information of the predefined subframe to a second transmission node, herein, the configuration information includes at least one of: time domain location information, a data transmission structure, and maximum transmission power of the predefined subframe.

In the abovementioned solution, the method further includes:

the first transmission node transmitting the configuration information of the predefined subframe to the second transmission node through a high layer signaling or a physical layer signaling.

In the abovementioned solution, the method further includes:

configuring maximum transmission power used by the predefined subframe for transmitting the data according to frequency point information and a system type of a system where the predefined subframe is located;

herein, when the system where the predefined subframe is located is a Time Division Duplexing, TDD, system, and when the TDD system is working on an uplink frequency spectrum in a Frequency Division Duplexing, FDD, system, the maximum transmission power configured for the TDD system is less than maximum transmission power of downlink data of the TDD system in a TDD frequency spectrum;

when the system where the predefined subframe is located is a TDD system, and the frequency spectrum of the TDD system uses full downlink data transmission, maximum transmission power for the TDD system is less than the maximum transmission power of the downlink data of the TDD system in the TDD frequency spectrum;

when the system where the predefined subframe is located is an FDD system, and the FDD system is working on a frequency spectrum of a TDD system, maximum transmission power configured for the FDD system is less than maximum transmission power of data of the FDD system in an FDD downlink frequency spectrum;

when the system where the predefined subframe is located is a long term evolution, LTE, system, and the LTE system is working on an unauthorized frequency spectrum, maximum transmission power configured for the LTE system is less than maximum transmission power of the LTE system in a LTE authorized frequency spectrum.

In the abovementioned solution, before the first transmission node transmitting data on the subframes according to the subframe types, the method further includes:

determining transmission power used by the predefined subframe for transmitting the data according to path loss information and/or interference information reported by a second transmission node;

correspondingly, the first transmission node transmitting the data with the transmission power on the predefined subframe.

In the abovementioned solution, after configuring the predefined subframe to switch between an uplink and a downlink within the time, the method further includes:

when the data is transmitted on the predefined subframe by using a transmission mode based on a user-specific reference signal and a channel for bearing the data is a physical downlink shared channel, PDSCH, when the predefined subframe on which the data is transmitted is a sounding reference signal, SRS, subframe, not transmitting the data on a last OFDM symbol of the predefined subframe;

when the predefined subframe on which the data are transmitted is a non-SRS subframe, transmitting the data on the last OFDM symbol of the predefined subframe.

In the abovementioned solution, after configuring the predefined subframe to switch between an uplink and a downlink within the time, the method further includes:

when the data is transmitted on the predefined subframe by using a transmission mode based on a user-specific reference signal and a channel for bearing the data is a PDSCH or an Enhanced Physical Downlink Control Channel, ePDCCH, determining a starting time-domain OFDM symbol of the PDSCH or the ePDCCH to be a first OFDM symbol of the predefined subframe.

In the abovementioned solution, before the first transmission node transmitting data by using the subframes having the subframe types, the method includes:

scheduling the data through control information;

herein, the control information is located in a control channel used by a transmission frequency band where the predefined subframe is located;

the control information is located in a control channel used by a subframe having a same serial number with the predefined subframe in a transmission frequency band corresponding to the transmission band; or, the control information is located at a position predetermined with the data.

In the abovementioned solution, the control channel includes at least one of the following: an ePDCCH, a physical uplink shared channel, PUSCH, and a physical downlink control channel, PDCCH.

In the abovementioned solution, before the first transmission node transmitting the data on the subframes according to the subframe types, the method further includes:

determining a multiple access mode used for transmitting the data according to a frequency band resource where the data is located, or according to a type of the data, or according to a correspondence relationship between uplink and downlink resources and a multiple access mode set for the data;

correspondingly, the first transmission node transmits the data on the predefined subframe with the multiple access mode.

In the abovementioned solution, the method further includes:

determining a data transmission mode for the data according a multiple access mode used by the data, or according to a type of the data, or according to a resource where the data is located, or according to a set correspondence relationship between the data and a data transmission mode used by the data;

correspondingly, the first transmission node transmitting the data with the data transmission mode on the predefined subframe.

The embodiment of the present document further provides a data transmission method applied to at least one fourth transmission node, herein the method includes:

the at least one fourth transmission node sending relevant information related to subframe types of the fourth transmission node and/or physical control channel frequency domain location information of the fourth transmission node to a first transmission node;

herein, the subframe types at least include a conventional subframe type and a predefined subframe type, herein configuring a conventional subframe corresponding to the conventional subframe type and a predefined subframe corresponding to the predefined subframe type include at least one of the following:

when the subframe types at least include a first predefined subframe type and a first conventional subframe type, configuring a different value for an element in a transmission structure respectively used by the first predefined subframe and the first conventional subframe; herein the element includes one of the following: a transmission mode of the data, a cyclic prefix length, a number of orthogonal frequency division multiplexing, OFDM, symbols, subcarrier spacing, and a resource unit of data transmission;

when the subframe types at least includes a second predefined subframe type and a second conventional subframe type, configuring the second conventional subframe to be an uplink subframe or a downlink subframe within a preset time; configuring the predefined subframe to switch between an uplink and downlink within the preset time;

when the subframe types at least includes a third predefined subframe type and a third conventional subframe type, configuring maximum transmission power of the third predefined subframe to be less than maximum transmission power of the third conventional subframe.

In the abovementioned solution, when the relevant information is relevant information of the predefined subframe type, the relevant information includes at least one of the following:

time domain information of the predefined subframe, frequency domain information of the predefined subframe, information of a data type transmitted on the predefined subframe, switch information of a cell where the fourth transmission node is located, information of transmission power used by the predefined subframe for transmitting data, interference information interfering the predefined subframe, a data transmission mode used by the predefined subframe, a cyclic prefix length, a number of OFDM symbols included in the predefined subframe, subcarrier spacing, and a resource unit of the data transmission.

The embodiment of the present document further provides a data transmission method applied to a second transmission node, herein the method includes:

the second transmission node receiving information of a predefined subframe configured by a first transmission node.

In the abovementioned solution, the method further includes:

the second transmission node feeding path loss information and/or interference information back to the first transmission node.

The embodiment of the present document further provides a data transmission device, applied to a transmission node, herein the device includes:

a first obtaining unit, configured to obtain subframe types of subframes for bearing data transmission;

a first transmitting unit, configured to transmit data on the subframes according to the subframe types;

a first configuring unit, configured to configure a conventional subframe corresponding to a conventional subframe type and a predefined subframe corresponding to a predefined subframe type through at least one of the following: herein, the subframe type at least includes the conventional subframe type and the predefined subframe type;

the first configuring unit is configured to, when the subframe type at least includes a first predefined subframe type and a first conventional subframe type, configure a different value for an element in a transmission structure respectively used by the first predefined subframe and the first conventional subframe; the element includes one of the following: a transmission mode of the data, a cyclic prefix length, a number of orthogonal frequency division multiplexing, OFDM, symbols, subcarrier spacing, and a resource unit of the data transmission;

the first configuring unit is configured to, when the subframe types at least includes a second predefined subframe type and a second conventional subframe type, configure the second conventional subframe to be an uplink subframe or a downlink subframe within a preset time; configure the second predefined subframe to switch between an uplink and a downlink within the preset time;

the first configuring unit is configured to, when the subframe types at least includes a third predefined subframe type and a third conventional subframe type, configure maximum transmission power of the third predefined subframe to be less than maximum transmission power of the third conventional subframe.

In the abovementioned solution, the device further includes:

a second obtaining unit, configured to obtain relevant information related to a predefined subframe and/or physical control channel frequency domain location information of at least one fourth transmission node, to make the first configuring unit configure the predefined subframe.

In the abovementioned solution, the relevant information includes:

time domain information of the predefined subframe, frequency domain information of the predefined subframe, information of a data type transmitted on the predefined subframe, switch information of a cell where the fourth transmission node is located, information of transmission power used by the predefined subframe for transmitting data, interference information interfering the predefined subframe, a data transmission mode used by the predefined subframe, a cyclic prefix length, a number of OFDM symbols included in the predefined subframe, subcarrier spacing, and a resource unit of the data transmission.

In the abovementioned solution, the first transmitting unit is further configured to transmit configured configuration information of the predefined subframe to other transmission nodes, herein, the configuration information includes at least one of the following: time domain location information, a data transmission structure, and maximum transmission power of the predefined subframe.

In the abovementioned solution, the first transmitting unit is configured to transmit the configuration information of the predefined subframe to the other transmission nodes through a high layer signaling or a physical layer signaling.

In the abovementioned solution, the device further includes:

a second configuring unit, configured to configure the maximum transmission power used by the predefined subframe for transmitting the data according to frequency point information and a system type of a system where the predefined subframe is located;

herein, the second configuring unit, is configured to, when the system where the predefined subframe is located is a time division duplexing, TDD, system and the TDD system is working on an uplink spectrum of a frequency division duplexing, FDD, system, configure maximum transmission power for the TDD system to be less than maximum transmission power of downlink data of the TDD system in a TDD frequency spectrum;

the second configuring unit is configured to, when the system where the predefined subframe is located is a TDD system and a frequency spectrum of the TDD system uses full downlink data transmission, configure the maximum transmission power for the TDD system to be less than the maximum transmission power of the downlink data of the TDD system in the TDD frequency spectrum;

the second configuring unit is configured to, when the system where the predefined subframe is located is an FDD system and the FDD system is working on a frequency spectrum of a TDD system, configure maximum transmission power for the FDD system to be less than maximum transmission power of data of the FDD system in a FDD downlink frequency spectrum;

the second configuring unit configured to, when the system where the predefined subframe is located is a long term evolution, LTE, system and the LTE system is working on an unauthorized frequency spectrum, configure maximum transmission power configured for the LTE system to be less than maximum transmission power of the LTE system in an LTE authorized spectrum.

In the abovementioned solution, the device further includes:

a first determining unit, configured to determine transmission power used by the predefined subframe for transmitting the data according to path loss information and/or interference information reported by a second transmission node;

correspondingly, the first transmission unit configured to transmit the data with the transmission power on the predefined subframe.

In the abovementioned solution, the first transmission unit is further configured to, when the data is transmitted on the predefined subframe by using a transmission mode based on a user-specific reference signal and a channel for bearing the data is a Physical Downlink Shared Channel, PDSCH;

when the predefined subframe transmitting the data is a sounding reference signal, SRS, subframe, not transmit the data on a last OFDM symbol of the predefined subframe;

when the predefined subframe transmitting the data is a non-SRS subframe, transmit the data on a last OFDM symbol of the predefined subframe.

In the abovementioned solution, the first transmission unit is further configured to, when the data is transmitted on the predefined subframe by using the transmission mode based on the user-specific reference signal, and the channel used for bearing the data is aPDSCH or an enhanced physical downlink control channel, ePDCCH, determine a starting time domain OFDM symbol of the PDSCH or the ePDCCH to be a first OFDM symbol of the predefined subframe.

In the abovementioned solution, the device further includes:

a scheduling unit, configured to schedule the data through control information;

herein, the control information is located in a control channel used by a transmission frequency band where the predefined subframe is located; or the control information is located in a control channel used by a subframe having a same serial number with the predefined subframe in a transmission frequency band corresponding to the transmission band; or, the control information is located at a position predetermined with the data.

In the abovementioned solution, the control channel includes at least one of the following: the ePDCCH, a physical uplink shared channel, PUSCH, and the physical downlink control channel, PDCCH.

In the abovementioned solution, the device further includes:

a second determining unit, configured to determine a multiple access mode for transmitting the data according to a frequency band resource where the data is located, or according to a type of the data, or according to a correspondence relationship between uplink and downlink resources and the multiple access mode set for the data;

correspondingly, the first transmission unit is configured to transmit the data with the multiple access mode on the predefined subframe.

In the abovementioned solution, the device further includes:

a third determining unit, configured to determine a data transmission mode for the data according to a multiple access mode used by the data, or according to a type of the data, or according a resource where the data is located or according to a set correspondence relationship set between the data and the data transmission mode used by the data;

correspondingly, the first transmission unit is configured to transmit the data with the data transmission mode on the predefined subframe.

The embodiment of the present document provides a first computer storage medium storing, herein, the first computer storage medium stores a first group of computer-executable commands, and the first group of computer-executable commands are used to execute the aforementioned data transmission method applied to the first transmission node.

The embodiment of the present document provides a second computer storage medium, herein the second computer storage medium stores a second group of computer-executable commands, and the second group of computer-executable commands are used to execute the aforementioned data transmission method applied to the fourth transmission node.

The embodiment of the present document provides a third computer storage medium storing, herein the third computer storage medium stores a third group of computer-executable commands, and the third group of computer-executable commands are used to execute the aforementioned data transmission method applied to the second transmission node.

The embodiments of the present document provides the data transmission method, device and related computer storage medium, and the method is applied to the first transmission node, including: obtaining subframe types of subframes for bearing data transmission; the first transmission node transmitting the data on the subframes according to the subframe types; herein, the subframe types at least includes a conventional subframe type and a predefined subframe type, and configuring a conventional subframe corresponding to a conventional subframe type and a predefined subframe type corresponding to the predefined subframe through at least one of the following: when the subframe types at least includes a first predefined subframe type and a first conventional subframe type, configuring a different values for an element in a transmission structure respectively used by the first predefined subframe and the first conventional subframe; the elements includes one of the following: a data transmission mode, a cyclic prefix length, a number of OFDM symbols, subcarrier spacing, a resource unit of data transmission; when the subframe types at least includes a second predefined subframe type and a second conventional subframe type, configuring the second conventional subframe to be an uplink subframe or a downlink subframe within a preset time; configuring the second predefined subframe to switch between the uplink and the downlink within the preset time; when the subframe types at least includes a third predefined subframe type and a third conventional subframe type, configuring the maximum transmission power of the third predefined subframe to be less than the maximum transmission power of the third conventional subframe. Using the predefined subframe can ensure improving the frequency spectral efficiency and reducing idle resources at the same time that the first transmission node transmits downlink data in the uplink frequency spectrum and/or transmits uplink data in the downlink frequency spectrum; at the same time, it solves the problem of interference in data transmission between adjacent transmission nodes and increases the system throughput.

BRIEF DESCRIPTION OF THE DRAWINGS

FIG. 4-1(a)~FIG. 4-1(d) and FIG. 4-2(a)~FIG. 4-2(d) are a first schematic diagram of a reference signal position provided in an embodiment of the present document;

FIG. 5 is a schematic diagram of a subframe configuration in an FDD transmission frequency band provided in an embodiment of the present document;

FIG. 6-1 and FIG. 6-2 are a second schematic diagram of the reference signal position provided in an embodiment of the present document;

DETAILED EMBODIMENTS

Hereinafter, embodiments of the present document will be described in detail in conjunction with the accompanying drawings, and it should be understood that the embodiments described hereinafter are only used to illustrate and explain the present document, but are not used to limit the present document.

At present, all the subframes use the same transmission structure in a certain time in the Long Term Evolution (LTE) system, for example, they use the same transmission mode, the same cyclic prefix length, the same number of orthogonal Frequency division multiplexing (OFDM) symbols, the same subcarrier spacing, the same resource unit of data transmission, etc., which intangibly limits the flexibility of data scheduling and reduces the frequency spectrum utilization efficiency. In addition, the existing solution uses underutilized uplink (downlink) frequency spectral resources for the downlink (uplink) transmission to improve the frequency spectrum utilization, but this method results in interference to uplink (downlink) data in the adjacent frequency spectrums, or, interference to uplink (downlink) data in the same resource of neighboring cells.

The following technical solution provided in the embodiment of the present document solves the problem of interference of data transmission between adjacent transmission nodes at the same time of solving the problem that the frequency spectrum utilization is relatively low.

The embodiment of the present document provides a flexible duplex (FD) mode, which is actually a mixture of FDD and TDD, that is, a predefined subframe is configured in the frame structure of the FD to achieve dynamic switch between the uplink subframe and the downlink subframe through the predefined subframe so that the FDD can transmit downlink data in the uplink transmission frequency band and transmits uplink data in the downlink transmission frequency band when an asymmetric service is performed on FDD, thereby improving the frequency utilization.

Meanwhile, in the embodiments of the present document, by configuring different types of subframes, such as a conventional subframe type which is compatible with the existing user equipment, and a predefined subframe type which is incompatible with the existing user equipment, in practice, the subframe can be flexibly scheduled according to different needs of the service and/or different types of the user equipment, thereby improving the frequency spectral efficiency. Furthermore, different types of subframes are configured with different maximum transmission powers, which can reduce the same frequency interference to the adjacent cells and also the interference to the adjacent frequency systems, and further improve the frequency spectral efficiency. The further description of the conventional subframe and the predefined subframe provided in the embodiment of the present document are described in the following technical solutions.

Figure 1:
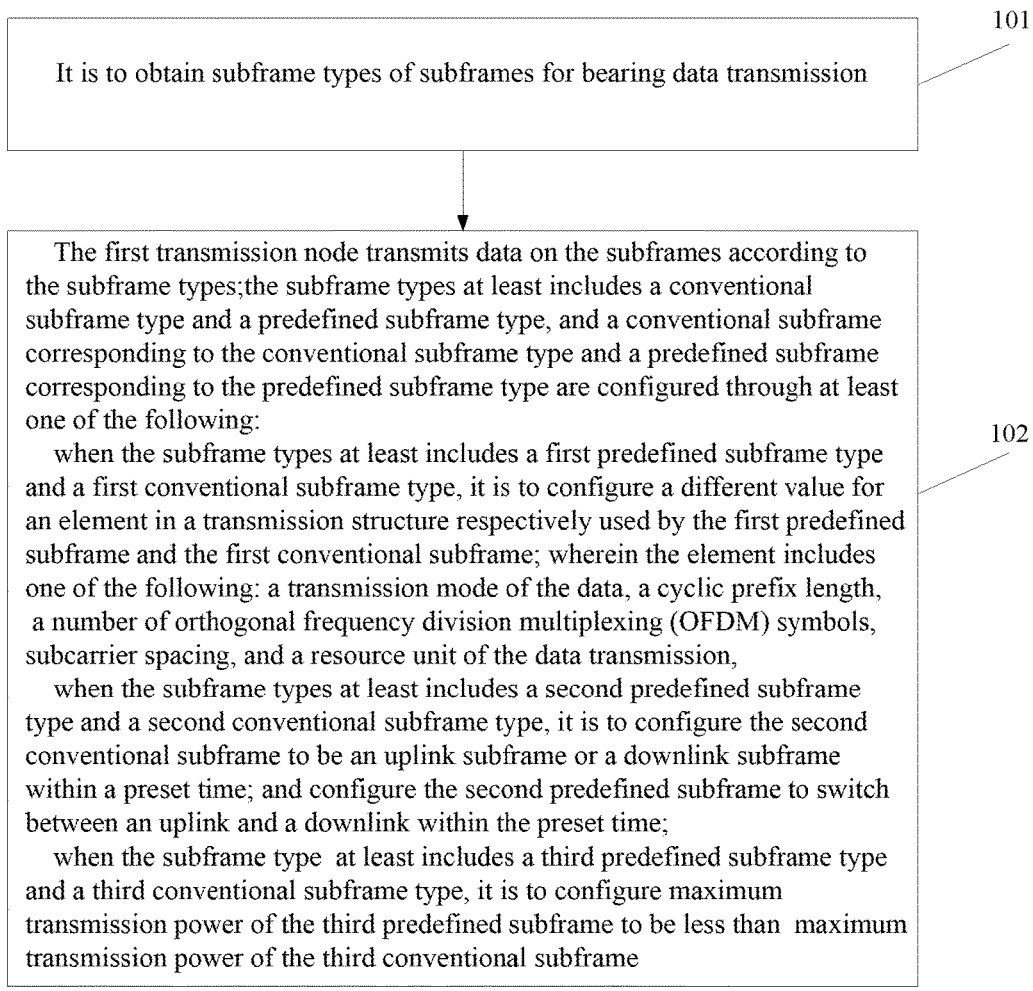
FIG. 1 is a flow chart of a data transmission method provided in an embodiment of the present document.

FIG. 1 is a flow chart of a data transmission method provided in the present document; as shown in FIG. 1, the method includes following steps.

In step 101: it is to obtain subframe typed of subframes for bearing t data transmission;

herein, the embodiment of the present document provides two types of subframes: a conventional subframe and a predefined subframe; and judges a subframe being which type of subframe by judging identification information in a frame structure of the subframe for bearing the data transmission, for example, each subframe in the frame structure is configured to correspond to one identifier, for example, identifier 0 indicates a conventional subframe, and identifier 1 indicates a predefined subframe; or, according to the correspondence relationship between a configured subframe index (serial number) information and the subframe type, for example, subframes with subframe indexes of 1 to 10 can be used as conventional subframes and subframes with subframe indexes 11 to 20 can be used as predefined subframes. In the embodiment of the present document, the subframe index of the current subframes used for bearing the data transmission can be obtained firstly, and then according to the correspondence relationship, the current subframe being which type of subframe is determined; herein, the description of the conventional subframe and the predefined subframe can refer to the following description.

Herein, before step 101, the method further includes that:

configuring the first transmission node with at least two subframe types and subframes corresponding to the subframe types.

Herein, when the subframe types configured for the first transmission node includes two types: the predefined subframe type and the conventional subframe type, subframes corresponding to the predefined subframe type are predefined subframes, and subframes corresponding to the conventional subframe types are conventional subframes.

In the embodiment of the present document, the configuration modes of the abovementioned predefined subframe and conventional subframe may use at least one of the following:

Mode 1: when the subframe types at least includes a first predefined subframe type and a first conventional subframe type, configuring different values for elements in transmission structures respectively used by the first predefined subframe and the first conventional subframe; the elements include one of the following: a data transmission mode, a cyclic prefix length, a number of the OFDM symbols, subcarrier spacing, and a resource unit of the data transmission.

Mode 2: when the subframe types includes at least a second predefined subframe type and a second conventional subframe type, configuring the second conventional subframe to be an uplink subframe or a downlink subframe within a preset time; configuring the second predefined subframe to switch between the uplink and the downlink within the preset time, that is, it may be used as an uplink subframe or a downlink subframe in two hours.

Method 3: when the subframe types at least includes a third predefined subframe type and a third conventional subframe type, configuring the maximum transmission power of the third predefined subframe to be less than the maximum transmission power of the third conventional subframe.

Herein, to facilitate the description of the following technical solution, the predefined subframes mentioned in the subsequent solution may be the first predefined subframe, and/or the second predefined subframe, and/or the third predefined subframe.

In the abovementioned solution, after configuring the predefined subframe to switch between the uplink and the downlink within the time, the method further includes:

when the data is transmitted on the predefined subframe by using the transmission mode based on the user-specific reference signal and the channel for bearing the data is a Physical Downlink Shared Channel (PDSCH), when it is judged that the predefined subframe for transmitting the data is a sounding reference signal (SRS) subframe, the data is not transmitted on the last OFDM symbol of the predefined subframe; when it is judged that the predefined subframe for transmitting the data is a non-SRS subframe, the data is transmitted on the last OFDM symbol of the predefined subframe.

Or, after configuring the predefined subframe to switch between the uplink and the downlink within the time, the method further includes:

when the data is transmitted on the predefined subframe by using the transmission mode based on the user-specific reference signal and the channel for bearing the data is the PDSCH or the enhanced physical downlink control channel (ePDCCH), determining that the starting time domain OFDM symbol of the physical downlink shared channel (PDSCH) or the enhanced physical downlink link control channel (ePDCCH) is the first OFDM symbol of the predefined subframe; here the starting time domain OFDM symbol is the first OFDM symbol of the predefined subframe. In one embodiment of the present document, when a guard interval is required between the subframe and its previous subframe, the starting time domain OFDM symbol may be the second OFDM symbol of the predefined subframe; the first OFDM symbol of the predefined subframe is used as a guard interval or other use;

when the subframe types configured for the first transmission node only includes the predefined subframe type, configuring maximum transmission power for a predefined subframe corresponding to the predefined subframe type such that the first transmission node utilizes the maximum transmission power to transmit the data. Herein, the maximum transmission power used by the predefined subframe in transmitting the data is configured according to frequency point information and a system type of the system where the predefined subframe is located.

In an embodiment of the present document, when the system where the predefined subframe is located is the TDD system and the TDD system is working on an uplink spectrum of the FDD system, the maximum transmission power configured for the TDD system is less than the maximum transmission power of downlink data of the TDD system in the TDD spectrum at this time, the conventional subframe is equivalent to the downlink subframe of the TDD system in the TDD spectrum;

when the system where the predefined subframe is located is the TDD system and the spectrum of the TDD system uses the full downlink data transmission, the maximum transmission power configured for the TDD system is less than the maximum transmission power of the downlink data of the TDD system in the TDD spectrum; at this time, the conventional subframe is equivalent to the downlink subframe of the TDD system in the TDD spectrum;

when the system where the predefined subframe is located is the FDD system and the FDD system is working on the spectrum of the TDD system, the maximum transmission power configured for the TDD system is less than the maximum transmission power of the data of the FDD system in the FDD downlink spectrum; at this time, the conventional subframe is equivalent to the downlink subframe of the FDD system in the FDD spectrum;

when the system in which the predefined subframe is located is the LTE system and the LTE system is working on an unauthorized spectrum, the maximum transmission power configured for the LTE system is less than the maximum transmission power of the LTE system in the LTE authorized spectrum at this time, the conventional subframe is equivalent to the downlink subframe of the LTE system in the LTE authorized spectrum.

Specifically, the way for using the configured maximum transmission power is: obtaining the transmission power used by the current first transmission node for transmitting data, and comparing the transmission power in use with the maximum transmission power. If the transmission power in use is larger than the maximum transmission power, the first transmission node transmitting the data with the maximum transmission power, if the transmission power in use is not larger than the maximum transmission power, the first transmission node transmitting the data with the transmission power in use.

In the abovementioned solution, the description of the conventional subframe can refer to the related description and will not be repeated here.

In step 102: a first transmission node transmits data on subframes according to subframe types.

Here, when the subframe having the subframe type is a predefined subframe, the first transmission node transmits the data with the determined multiple access mode, and/or transmission power, and/or data transmission mode on the predefined subframe.

Herein, the method for determining the transmission power may be: determining the transmission power used by the subframe for transmitting the data according to the path loss information and/or the interference information reported by the second transmission node, herein, the path loss information is path loss generated on the transmission path from the first transmission node to the second transmission node; and the interference information is the interference generated on the transmission path from the first transmission node to the second transmission node.

Herein, the method for determining the multiple access mode may be: determining the multiple access mode used for transmitting the data according to the frequency band resources in which the data is located, for example, when transmitting the downlink data in the uplink band resources, the downlink data is transmitted in the Single-carrier frequency division multiple access (SC-FDMA) mode, and when the uplink data is transmitted in the downlink band resources, the uplink data is transmitted in the OFDM multiple access mode.

Or, the multiple access mode for transmitting the data is determined according to the data type, for example, when the downlink data is transmitted on the uplink band resource, the downlink data is transmitted in the OFDM mode, and when the uplink data is transmitted in the downlink band resources, the uplink data is transmitted in the SC-FDMA mode.

Or, the multiple access mode for transmitting the data may be determined based on a correspondence relationship between the uplink and downlink resources configured for the data and the multiple access mode, for example, when the downlink data is transmitted on the uplink band resources, the downlink data are transmitted in the SC-FDMA mode, and when the uplink data is transmitted on the downlink band resources, the uplink data is transmitted in the SC-FDMA mode; or, when the downlink data is transmitted on the uplink frequency band resources, the downlink data are transmitted in the OFDM mode, and when the uplink data is transmitted on the downlink band resources, the uplink data is transmitted in the OFDM mode.

Herein, the method for determining the data transmission method may be: determining a data transmission mode for the data according to the multiple access mode used by the data, for example, the data transmission mode used in the multiple access mode of SC-FDMA is the physical uplink shared channel (PUSCH)/SRS/demodulation reference signal (DMRS) structure, the data transmission method used in the OFDM is the Physical Downlink Shared Channel (PDSCH)/Channel state indication reference signal (CSI-RS)/DRS;

or, the data transmission mode is determined for the data according to the data type, for example, the data transmission structure used by the uplink data is the PUSCH/SRS/DMRS structure, and the data transmission structure used by the downlink data is the PDSCH/CSI-RS/DRS structure;

or, the data transmission mode is determined for the data according to the resources where the data is located, for example, the data transmission structure used by the uplink band resources is the PUSCH/SRS/DMRS structure, and the data transmission structure used by the downlink band resources is the PDSCH/CSI-RS/DRS structure;

or, the data transmission mode is determined for the data according to the configured correspondence relationship between the data and the data transmission mode used by the data, for example, the correspondence relationship is that the data transmission mode used by the data is the PDSCH/PUSCH/new format structure, or the SRS/CSI-RS/DMRS/DRS/new RS structure.

In the flexible duplex mode provided in the embodiment of the present document, it is also possible to solve the problem of data transmission interference between adjacent transmission nodes at the same time of solving the problem of the low frequency spectrum utilization. The following solution explains how to solve this transmission interference problem and also describes the technical solution of the embodiment of the present document in further detail.

Figure 2:
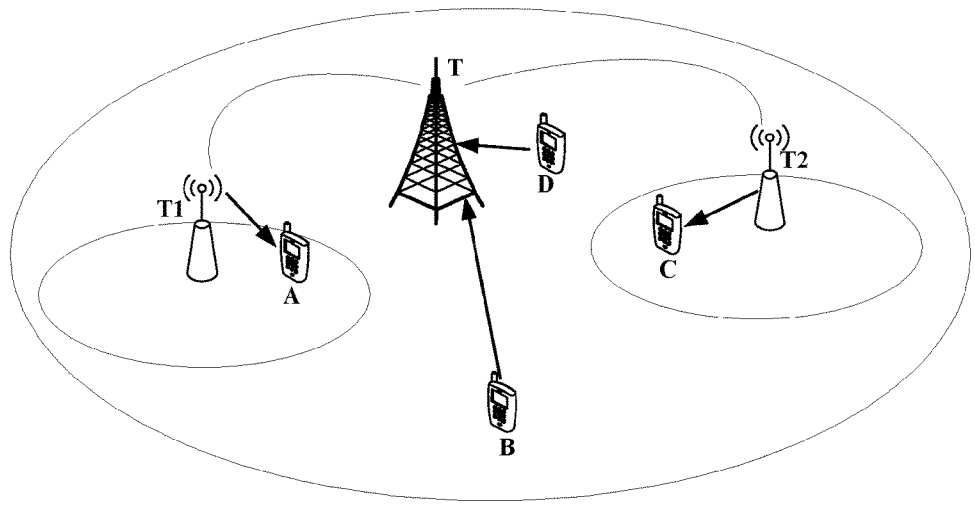
FIG. 2 is a schematic diagram of a first application scenario provided in an embodiment of the present document.
Figure 3:
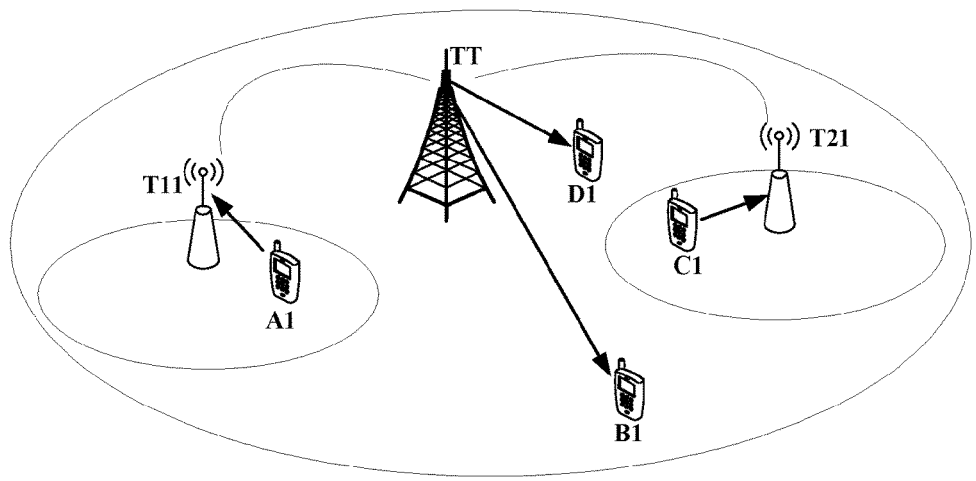
FIG. 3 is a schematic diagram of a second application scenario provided in an embodiment of the present document.

In the flexible duplex mode, the most typical case is that the downlink data is transmitted on the uplink transmission frequency band of the FDD and/or the uplink data is transmitted in the downlink transmission frequency band of the FDD, FIG. 2 and FIG. 3 provided in the embodiment of the present document takes the uplink transmission frequency band of the FDD transmitting the downlink data as an example; and FIG. 2 and FIG. 3 are described through the following solution.

FIG. 2 is a schematic diagram of a first application scenario provided in the embodiment of the present document; in FIG. 2, transmission node T (Macro base station), transmission node T1 (Small Cell/radio frequency remote head (RRH)), and transmission node T2 (Small cell/Radio frequency remote head (RRH)) are adjacent transmission nodes that use the same transmission frequency band, specifically the same uplink transmission frequency band;

Terminal B and terminal D transmit the uplink data to the transmission node T by using the uplink transmission frequency band, the transmission node T1 transmits the downlink data to the terminal A by using the uplink transmission frequency band, and the transmission node T2 also uses the uplink transmission frequency band to transmit the downlink data to the terminal C;

herein, since the terminal D is located relatively close to the transmission node T, which results that the uplink data transmitted from the terminal D to the transmission node T has less interference to the downlink data transmitted from the transmission node T1 (T2) to the terminal A (C), whereas the terminal B is relatively far away from the transmission node T, which results in that the uplink data transmitted from the terminal B to the transmission node T has a relatively large interference to the downlink data transmitted from the transmission node T1 (T2) to the terminal A (C). In FIG. 2, if the transmission node T1 is taken as the target transmission node, the interference in this application scenario is mainly the interference of the transmission node T to the target transmission node (transmission node T1/T2).

FIG. 3 is a schematic diagram of a second application scenario provided in an embodiment of the present document. In FIG. 3, transmission node TT (Macro base station), transmission node T11 (Small Cell/Radio Frequency Remote Head (RRH)), transmission node T21 (Small Cell/Radio Frequency Remote Head (RRH)) are adjacent transmission nodes that use the same transmission band, specifically the same uplink transmission band.

In FIG. 3, the terminal A1 transmits the uplink data to the transmission node T11 by using the uplink transmission frequency band, and the terminal C1 transmits the uplink data to the transmission node T21 by using the uplink transmission frequency band, the transmission node TT transmits the downlink data to the terminal B1 and the terminal D1 by using the uplink transmission band; herein the terminal D1 is relatively close to the transmission node TT, resulting in that the downlink data transmitted by the transmission node TT to the terminal D1 has relatively small interference to the transmission of the uplink data received by the transmission nodes T11 and T21; and the terminal B1 is relatively far from the transmission node TT, resulting in that the downlink data transmitted by the transmission node TT to the terminal B1 has relatively large interference to the transmission of the uplink data received by the transmission nodes T11 and T21; in FIG. 3, if the transmission node TT is taken as the target transmission node, in this application scenario, the interference is mainly due to the interference of the target transmission node to the transmission nodes T11 and T21.

In the abovementioned solution, the method further includes:

obtaining the relevant information related to the subframe types and/or the physical control channel frequency domain location information of the at least one fourth transmission node, so that the first transmission node configures the predefined subframe.

Correspondingly, the at least one fourth transmission node transmits its own relevant information related to the subframe types and/or its own physical control channel frequency domain location information to the first transmission node.

Herein, the at least one fourth transmission node is another transmission node that uses the same transmission frequency band with the first transmission node. The same transmission frequency band includes: the same uplink transmission frequency band or the same downlink transmission frequency band; the first transmission node and other transmission nodes using the same transmission band for transmission are regarded as adjacent transmission nodes.

When the same transmission frequency band used by the first transmission node and the fourth transmission node is an uplink transmission frequency band, the first transmission node may transmit the downlink data on the predefined subframe of the uplink transmission frequency band; when the same transmission band is a downlink transmission frequency band, the first transmission node may transmit the uplink data on the predefined subframe of the downlink transmission frequency band.

Herein, the physical control channel frequency domain location includes: a Physical Uplink Control Channel (PUCCH) and/or a Physical Downlink Control Channel (PDCCH); in the embodiment of the present document, the physical control channel frequency location information of the transmission node and the frequency domain scheduling can be used to avoid the impact of the data transmission on the physical control channel of the adjacent transmission nodes.

The relevant information includes at least one of the following:

time domain information of the predefined subframe, frequency domain information of the predefined subframe, data type information of the predefined subframe, switch information of a cell where the at least one fourth transmission node is located, transmission power information used by the predefined frame for transmitting data, interference information interfering the predefined subframe, a data transmission mode used by the predefined subframe, a cyclic prefix length, a number of OFDM symbols included in the predefined subframe, subcarrier spacing, and a resource unit of the data transmission; herein, the data type information is uplink data transmission or downlink data transmission; the data transmission mode includes data coding and modulation information.

The first transmission node configures a predefined subframe for itself according to the obtained relevant information and the frequency domain location information.

In one embodiment of the present document, when the relevant information obtained by the first transmission node is the switch information of the cells where the other transmission nodes are located and the cells of all the other transmission nodes are determined to be in an off state, any subframe divided into the transmission frequency band used by the first transmission node is selected as the predefined subframe of the first transmission node.

When the relevant information obtained by the first transmission node is the switch information of the cells where the other transmission nodes are located and at least one of the cells of all the other transmission nodes is determined to be in an on state, it is processed according to one of the following method 1 to method 5.

Method 1: when the relevant information obtained by the first transmission node has both the time domain information and the frequency domain information, it is to determine a subframe with the minimum time domain interference and the minimum spectrum interference as the predefined subframe of the first transmission node.

Method 2: when the relevant information obtained by the first transmission node is a set of subframes in the time domain information, it is to determine a set of subframes with the minimum power as the predefined subframes of the first transmission node.

Method 3: when the relevant information obtained by the first transmission node is the time domain interference information in the time domain information, it is to determine a subframe with the minimum time domain interference as the predefined subframe of the first transmission node.

Method 4: when the information obtained by the first transmitting node is the PUCCH frequency domain position, it is to determine the subframes divided for the frequency domain resources other than the PUCCH frequency domain resource in the transmission band used by the first transmission node as the predefined subframes of the first transmission node.

Method 5: when the relevant information obtained by the first transmission node is high interference (HI) information and/or overload indicator (OI) information, it is to determine a subframe with the minimum spectral interference according to the HI information and/or OI information, and take the subframe as the predefined subframe of the first transmission node.

It should be noted that the resource information in the method 1 to method 5 is the resource information of the transmission node whose cell is in the on state.

After using the abovementioned technical solution to configure the predefined subframe, the first transmission node such as the base station transmits the configured configuration information of the predefined subframe to the second transmission node such as the terminal;

correspondingly, the second transmission node receives the configuration information, so as to transmit the data on the predefined subframe with the configuration information; herein the configuration information includes at least one of the following: position information of the predefined subframe, the data transmission structure, and the maximum transmission power. The first transmission node such as the base station transmits the configuration information of the predefined subframe to the second transmission node such as the terminal in a mode of a set of subframes through the high layer signaling or the physical layer signaling;

In the duplex mode provided in the embodiment of the present document, the following technical solution provided in the embodiment of the present document is to solve the problem of interference in data transmission existed between adjacent transmission nodes; that is, the following technical solution can solve the problem of the interference of the non-target transmission node (transmission node T) to the target transmission node (transmission node T11/T21) in FIG. 2, as well as solve the problem of the interference of the target transmission node (transmission node TT) to the non-target transmission node (transmission node T1/T2) in FIG. 3.

From the abovementioned content, it can be seen that the interference faced in FIG. 2 is the interference mainly caused by the transmission node T (the fourth transmission node) to the target transmission node, taking the transmission node T1 in FIG. 2 being the first transmission node (the target transmission node) for example (the processing on the transmission node T2 is the same as that on the transmission node T1); the embodiment of the present document will be further described below with combination of the application scenario shown in FIG. 2.

The transmission node T and the transmission node T1 are adjacent transmission nodes using the same uplink transmission band, and when the obtained relevant information is the switch state information of the cell where the transmission node T adjacent to the transmission node T1 is located and the cell is in the off state, any one of the subframes divided onto the transmission frequency band such as the uplink transmission frequency band can be selected as the predefined subframes of the transmission node T1, the transmission node T1 uses the predefined subframe in the uplink transmission frequency band to transmit the downlink data to the terminal A. At this time, the determined predefined subframe can be used to transmit the downlink data to the terminal A in the uplink transmission frequency band, which significantly improve the frequency utilization; at the same time, because the transmission node is off, the transmission node T1 does not generate interference to the transmission node T, and the transmission node T1 does not need to consider the problem of interference to the transmission node T.

The transmission node T and the transmission node T1 are adjacent transmission nodes using the same uplink transmission band, and the transmission node T receives the uplink data transmitted by the terminal B in the uplink transmission frequency band, and when the relevant information obtained by the transmission node T is the time domain information and the frequency domain information of the transmission node T, the subframe with the minimum time-domain interference and the minimum frequency-domain interference is determined as the predefined subframe of the transmission node T1; the transmission node T1 transmits the downlink data to the terminal A through the predefined subframe in the uplink transmission frequency band. Herein, the determined predefined subframe can be used to transmit the downlink data in the uplink transmission frequency band, which greatly improves the efficiency of frequency spectrum utilization; meanwhile, although the data transmission is performed in the uplink transmission frequency band, the interference of the uplink data transmitted by the terminal B to the downlink data transmitted by the transmission node T1 is reduced because the transmission node T1 transmits on the subframe with the minimum interference.

The transmission node T and the transmission node T1 are adjacent transmission nodes using the same uplink transmission band, the transmission node T receives the uplink data transmitted by the terminal B in the uplink transmission frequency band, and in accordance with the position of the terminal B in the macro cell, the transmission node T divides the uplink subframes in the uplink transmission band into two or more sets: for example, divides them into two sets: a set of cell edge subframes and a set of cell center subframes; the relevant information obtained for the transmission node T1 is the set of subframes in the time domain information, and because the transmission power of the corresponding terminals on the set of cell center subframes is relatively small, the set of cell center subframes is the predefined subframes of the transmission node T1, and the transmission node T1 transmits the downlink data to the terminal A by using the predefined subframe in the uplink transmission frequency band. Here, the downlink data can be transmitted in the uplink transmission frequency band by using the determined predefined subframe, which greatly improves the efficiency of frequency spectrum utilization; at the same time, because the transmission power of the corresponding UE in the set of cell center subframes is relatively small, the transmission interference of the uplink data transmitted by the terminal B in the macro cell to the downlink data transmitted by the transmission node T1 is reduced; thus, the problem of interference of the uplink data and the downlink data between different transmission nodes is solved.

The transmission node T and the transmission node T1 are adjacent transmission nodes using the same uplink transmission frequency band, and the transmission node T receives the uplink data transmitted by the terminal B in the uplink transmission frequency band, and when the relevant information obtained for the transmission node T1 is the time-domain interference information of the transmission node T, the subframe with the minimum time-domain interference is determined as the predefined subframe of the transmission node T1; the transmission node T1 transmits the downlink data to the terminal A through the predefined subframe in the uplink transmission frequency band. Here the determined predefined subframe can be used to transmit the downlink data in the uplink transmission frequency band, thus greatly improving the efficiency of frequency spectrum utilization.

The transmission node T and the transmission node T1 are adjacent transmission nodes using the same uplink transmission frequency band, the transmission node T receives the uplink data transmitted by the terminal B in the uplink transmission frequency band, and the information obtained by the transmission node T1 is the PUCCH frequency domain position, and subframes in frequency domain resources other than the PUCCH frequency domain resource are used as predefined subframes of the transmission node T1; the transmission node T1 transmits the downlink data to the terminal A through the predefined subframe in the uplink transmission frequency band. Here, the determined predefined subframes can be used to transmit downlink data in the uplink transmission frequency band, which greatly improves the efficiency of frequency spectrum utilization; meanwhile, the transmission node T1 avoids the uplink control channel of the terminal B when transmitting the downlink data, thus reducing the transmission interference of the uplink control channel of the terminal B to the downlink data of the transmission node T1 as well as the transmission interference of the downlink data to the uplink control channel, thereby solving the problem of interference of the uplink data and downlink data between different transmission nodes.

The transmission node T and the transmission node T1 are adjacent transmission nodes using the same uplink transmission band, the transmission node T receives the uplink data transmitted by the terminal B in the uplink transmission frequency band, and when the information obtained by the transmission node T1 is the HI information and the OI information in the interference information, the spectral interference is determined based on the HI information and the OI information, and the subframes having the minimum spectral interference are taken as predefined subframes of the transmission node T1, and the transmission node T1 transmits the downlink data to the terminal A on the predefined subframes in the uplink transmission frequency band. Here, the determined predefined subframes can be used to transmit downlink data in the uplink transmission frequency band, thus greatly improving the efficiency of frequency spectrum utilization. Herein, the specific implementation process of using the HI information and the OI information to determine the spectral interference can refer to the existing related description and will not be repeated here.

In the abovementioned solution, before the control transmission node T1 transmits the downlink data to the terminal A through the predefined subframe in the uplink transmission frequency band, the configuration information of the predefined subframe is notified to the terminal A.

Herein, in the FDD, the transmission node T1 transmits the configuration information to the terminal A in the following way:

a bitmap mode, for example, one bit corresponds to one predefined subframe;

and/or, a subframe set may be used in such a way that subframes are numbered in odd and even numbers, and odd or even numbered subframes are configured as the predefined subframe set. In an embodiment of the present document, a high-layer signaling such as a Radio Resource Control (RRC) signaling or physical layer signaling such as the downlink/uplink control signaling can be used to notify the terminal A of the set of predefined subframes;

and/or, the discrete frequency band resources are combined to form a virtual resource and the virtual resource is notified to the terminal A as a predefined subframe resource, for example, the resources in which the OFDM symbols in the last part of one subframe and the OFDM symbols in the first part of another adjacent subframe are combined into a virtual resource, the virtual resource is taken as the as the predefined subframe resource, and the virtual resource is notified to the terminal A; or, the resource in which the OFDM symbols in the middle part of one subframe are located and the resource of the OFDM symbols in the middle part of another adjacent or non-adjacent subframe are located are combined into a virtual resource, and the virtual resource is used as a predefined subframe resource.

In the TDD, in addition to the abovementioned modes, the following modes may be further used.

The predefined subframe is configured through the current allocation ratio of the used subframe in the uplink and downlink transmission frequency bands, and the terminal A is notified;

and/or, the predefined subframe is configured through the reference timing fed back by the Hybrid Automatic Repeat Request (HARQ) and the terminal A is notified; the specific implementation of the two configuration modes can refer to the related description and is not repeated here.

When the first transmission node uses the predefined subframe to transmit data, it may further transmit the data with the determined transmission power; herein the method for determining the transmission power includes:

determining the transmission power used by the subframe for transmitting the data according to the path loss information and/or interference information reported by the second transmission node such as the terminal; herein the path loss information is the path loss generated on the communication path when the first transmission node transmits the data to the second transmission node; the interference information is the interference generated on the communication path when the first transmission node transmits the data to the second transmission node.

obtaining the relevant modulation and demodulation information of the data transmitted by the first transmission node;

the first transmission node transmitting the relevant modulation and demodulation information to the second transmission node so that the second transmission node uses the relevant modulation and demodulation information to cancel the interference between the first transmission node and the second transmission node.

From the abovementioned content, it can be seen that the interference described in FIG. 3 is mainly the interference of the target transmission node to the transmission node T11 (the second transmission node), it is to take the transmission node TT as the first transmission node (target transmission node) in FIG. 3 for example, the embodiment of the present document will be further described with combination of the application scenario shown in FIG. 3.

The transmission node TT and the transmission node T11 are adjacent transmission nodes that use the same uplink transmission band. Herein the transmission node T11 receives the data transmitted by the terminal A1 in the uplink transmission frequency band, the transmission node TT transmits the downlink data to the terminal B1 in the uplink transmission frequency band, obtains the downlink path loss information from the transmission node TT to the terminal B1 that is fed back by the terminal B1 to the transmission node TT; herein, the downlink path loss information includes at least one of the following: path loss information generated when transmitting the downlink signal in the uplink transmission frequency band, and path loss information generated when transmitting the downlink signal in the downlink transmission frequency band corresponding to the uplink transmission frequency band; and it is to determine the corresponding transmission power for the transmission node TT according to the downlink path loss information, for example, the determined transmission power is relatively large when the downlink path loss exceeds the preset path loss threshold, and the determined transmission power is relatively small when the downlink path loss does not exceed the path loss threshold, therefore, the transmission interference of the downlink data to the uplink data due to the excessive transmission power of the transmission node TT can be avoided.

The transmission node TT and the transmission node T11 are adjacent transmission nodes that use the same uplink transmission frequency band. Herein, the transmission node T11 receives the data transmitted by the terminal A1 in the uplink transmission frequency band, and the transmission node TT transmits the downlink data to the terminal B1 in the uplink transmission frequency band; the terminal B1 transmits the uplink signal according to the absolute power configured by the base station for the terminal B1, obtains the absolute power and estimates the path loss for the transmission node TT based on the absolute power used when the terminal B1 transmits the uplink signal, and determines the corresponding transmission power for the transmission node TT based on the estimated path loss, for example, the determined transmission power is relatively large when the path loss exceeds the path loss threshold and the determined transmission power is relatively small when the path loss does not exceed the path loss threshold. Therefore, the problem of transmission interference of the downlink data to the uplink data due to the excessive transmission power of the transmission node TT can be avoided.

In the abovementioned solution, after determining the corresponding transmission power for the transmission node TT according to the path loss information, it may further include: comparing the determined transmission power with the upper limit value of the transmission power, that is, the power threshold, set for the transmission node TT, and when the comparison result is that the determined transmission power does not exceed the power threshold, the transmission node TT transmits the data on the predefined subframe by using the determined transmission power; and when the comparison result is that the determined transmission power exceeds the power threshold, the transmission node TT uses the power threshold to transmit data on the predefined subframe.

The transmission node TT and the transmission node T11 are adjacent transmission nodes that use the same uplink transmission band. Herein, the transmission node T11 receives the data transmitted by the terminal A1 in the uplink transmission frequency band, and the transmission node TT transmits the downlink data to the terminal B1 in the uplink transmission frequency band; the transmission node T11 measures the interference generated when the transmission node TT transmits the downlink data, creates the interference measurement information, obtains the interference measurement information for the transmission node TT, and determines the corresponding transmission power for the transmission node TT according to the interference measurement information, for example, when the measured interference exceeds the preset interference threshold, the determined transmission power is relatively large, and when the measured interference does not exceed the interference threshold, the determined transmission power is relatively small. Therefore, the transmission interference of the downlink data to the uplink data due to the excessive transmission power of the transmission node TT can be avoided.

The transmission node TT and the transmission node T11 are adjacent transmission nodes that use the same uplink transmission band. Herein the transmission node T11 receives the data transmitted by the terminal A1 in the uplink transmission frequency band, the transmission node TT transmits the downlink data to the terminal B1 in the uplink transmission frequency band; obtains the relevant modulation and demodulation information generated when the current transmission node transmits the downlink data; herein, the relevant modulation and demodulation information includes: a modulation mode, a transport block size, a time-frequency position, power information, a transmission mode, and a scrambling code identifier; the transmission node TT transmits the relevant modulation and demodulation information to the transmission node T11 so that the transmission node T11 can cancels the interference between the transmission node TT and itself by using the relevant modulation and demodulation information.

Herein, the method for the transmission node T11 cancelling interference by using the related modulation/demodulation information can be interference cancellation or suppression method, or the multiple-input multiple-output (MIMO) technique. The specific implementations of these methods can refer to the related description in the related art and are not repeated here.

In step 102, the data may be transmitted on the predefined subframe by using the transmission mode based on the user-specific reference signal, the receiver such as the terminal receives the data, uses the reference signal to demodulate the useful data, so that in the transmission mode based on the specific reference signal, the position selection of the reference signal plays a role in avoiding the interference of the downlink (uplink) data to the uplink (downlink) data reference signal.

In the embodiment of the present document, in the transmission mode based on the user-specific reference signal, when the channel for bearing the data is the PDSCH channel, the position of the reference signal to be configured as the reference signal position that is used when the special subframes are configured as 3, 4, 8 and 9 in the TDD system in the conventional cyclic prefix scenario, as shown in FIG. 4-1(*a*) to FIG. 4-1(*d*); and the position of the reference signal may also be configured as shown in FIG. 4-2(*a*) to FIG. 4-2(*d*). Herein, R7 to R10 represent the reference signals corresponding to different antenna ports, and the remaining resources are resources for transmitting data. The reference signals shown in FIG. 4-2 (*a*) to FIG. 4-2(*d*) can avoid position overlap with the uplink demodulation reference signal.

At the same time, in order to avoid the interference of the downlink (uplink) data transmitted in the transmission frequency band to the uplink (downlink) data transmitted in the same transmission frequency band, when using the PDSCH channel or ePDCCH, the starting time domain OFDM symbol of the PDSCH or ePDCCH is determined as the first OFDM symbol of the predefined subframe and when it is judged that the predefined subframe for transmitting the downlink (uplink) data is the SRS subframe, the downlink (uplink) data on the last OFDM symbol of the predefined subframe is removed, that is, the data is not transmitted on the last OFDM symbol of the predefined subframe; when it is judged that the predefined subframe for transmitting the downlink (uplink) data is not an SRS subframe, the downlink (uplink) data is transmitted on the last OFDM symbol of the predefined subframe. Therefore, the collision of the downlink data with the SRS of the neighboring cell is avoided, or the collision of the downlink data with the SRS of other UEs in the same cell is avoided. Herein, the SRS subframe may be an SRS subframe actually configured by the transmission node, or a virtual SRS subframe.

For convenience of explanation, the positions of the reference signals shown in FIG. 4-1 (*a*) to FIG. 4-1 (*d*), and FIG. 4-2 (*a*) to FIG. 4-2 (*d*) as well as and the positions of the reference signals shown in the following FIG. 6-1 and FIG. 6-2 are based on the Long Term Evolution (LTE) system. Since one subframe in the LTE system includes 14 OFDM symbols and one physical resource block (RB) includes 12 carriers, thus there are 14 grids in a row and 12 grids in a column in the figure, and from FIG. 4-1(*a*) to FIG. 4-1(*d*) and FIG. 4-2 (*a*) to FIG. 4-2 (*d*), the positions of the reference signals Rn (n=7, 8, 9, 10 on the LTE subframe can be seen.

In the embodiment of the present document, when the channel for bearding the data is the PUSCH, in the transmission mode based on the user-specific reference signal, the configured reference signal may use the position of the reference signal corresponding to the PUSCH channel.

In one embodiment of the present document, before controlling the current transmission node to transmit the data, the method further includes: scheduling the data through the control information of the current transmission node in the transmission frequency band.

Herein, the position of the control information may be that:

the control information is located in a control channel used by a transmission frequency band where the predefined subframe is located; or, the control information is located in a control channel used in a subframe having the same number as the predefined subframe in a transmission frequency band corresponding to the transmission band; or, the control information is located at a position predetermined with the data.

In FDD, it is to take the transmission frequency band being an uplink frequency transmission band and the current transmission node transmitting the downlink data on the predefined subframe in the uplink transmission frequency band for example, and with combination of FIG. 5, the scheduling of the position of the downlink control information of the downlink data will be described.

In FIG. 5, it is to take each of the uplink and downlink transmission frequency bands of the FDD having 10 subframes for example: serial numbers of uplink subframes are respectively UF1 to UF10, and serial numbers of downlink subframes are DF1 to DF10 respectively. It is assumed that the determined predefined subframe in the uplink transmission band is UF2;

position 1: the downlink control information is located in the downlink control channel used by the predefined subframe; UF2 is a predefined subframe in the uplink transmission frequency band, and the downlink control information is located in the downlink control channel used by the predefined subframe.

Position 2: it is to find out a subframe having the same serial number as the predefined subframe in the transmission frequency band, corresponding to the uplink transmission frequency band, that is the downlink transmission band, and the downlink control information is located in the downlink control channel used by the found-out subframe, the UF2 is a predefined subframe in the uplink transmission frequency band, and the subframe having the same subframe serial number as the UF2 in the downlink transmission band is the DF2 subframe, and the downlink control information is located in the downlink control channel used by the DF2 subframe.

Position 3: the downlink control information is located in a position predetermined with the downlink data; the UF6 is the predefined subframe in the uplink transmission frequency band, and the downlink data is transmitted in the UF6. It is assumed that when the downlink data is transmitted in the UF6, the downlink control information is located on the UF2 subframe in the downlink transmission frequency band, and is transmitted similarly as the uplink data and scheduled and timed with the downlink control information corresponding to the uplink data.

When the position of the downlink control information is the position 1 or position 2 or position 3, the channel for bearing the downlink control information may be the downlink control channel in use that is the ePDCCH channel, or the PUSCH channel, or may be the PDCCH channel.

Herein, when it is the ePDCCH channel, the position of the reference signal can be configured as the position of the user-specific reference signal used in the TDD when the special subframes are configured as 3, 4, 8, 9 in the conventional cyclic prefix scenario, as shown in FIG. 4-1(*a*) to FIG. 4-1(*d*), or may be the positions shown in FIG. 4-2 (*a*) to FIG. 4-2 (*d*). Here, the data processing on the last OFDM symbol of the predefined subframe is also judged according to whether the pre-defined subframe is the SRS subframe type, and the specific process can refer to the above description.

Herein, when it is the PUSCH channel, the position of the reference signal to be configured may be the position of the user-specific reference signal used when the special subframes are configured as 3, 4, 8, 9 in the TDD in the conventional cyclic prefix scenario, as shown in FIG. 6-1; the position of the reference signal shown in FIG. 6-2 may also be used. As can be seen from the above description, the selection of the reference position plays a role in avoiding the interference of the downlink (uplink) data to the uplink (downlink) data reference signal. Therefore, in the embodiment of the present document, when the control channel bearing the downlink control information is the PUSCH channel, the positions of the two reference signals shown in FIG. 6-1 and FIG. 6-2 are provided.

In the above solution, the process of transmitting the downlink data in the FDD uplink transmission band is taken for example, the process of transmitting uplink data in the FDD/TDD downlink transmission frequency band as well as the process of transmitting the downlink data in the TDD uplink transmission frequency band are similar to the abovementioned process and are not repeated here.

As an embodiment of the present document, since the TDD/FDD-LTE system can define a subframe in terms of subcarrier spacing, a cyclic prefix length, a resource block size, a subframe length, etc.; in order to meet this characteristic of the LTE system, the predefined subframes determined in the embodiment of the present document may also be considered as non-compliant subframes, the division of whose structure can be configured according to practical applications.

For example:

the new transmission mode defined in the non-compatible subframe is used to transmit data, herein the newly-defined transmission mode includes: a new reference signal pattern, and/or an antenna port, whereas the existing transmission mode defined in the LTE R12 is used to transmit data on the conventional subframe.

the non-compatible subframe transmits data by using newly-defined cyclic prefix and/or a newly-defined subcarrier interval, such as a cyclic prefix shorter than the cyclic prefix in the LTE system, a subcarrier spacing larger than the subcarrier spacing in the LTE system, or, a cyclic prefix and subcarrier spacing with other sizes, whereas the data is transmitted on conventional subframes by using existing cyclic prefixes and/or subcarrier spacing defined in the LTE.

A newly defined resource unit is used to transmit data on the non-compliant subframes, for example, a resource unit with a time domain length of 0.1 ms or a frequency domain length of 200 kHz, or a resource unit with other sizes, whereas conventional subframes transmit data by using existing resource units defined in the LTE, such as a resource unit with a time domain length of 0.5 ms and a frequency domain length of 180 kHz.

Herein, the definition of the non-compatible subframe can refer to the existing description and is not repeated here.

Figure 7:
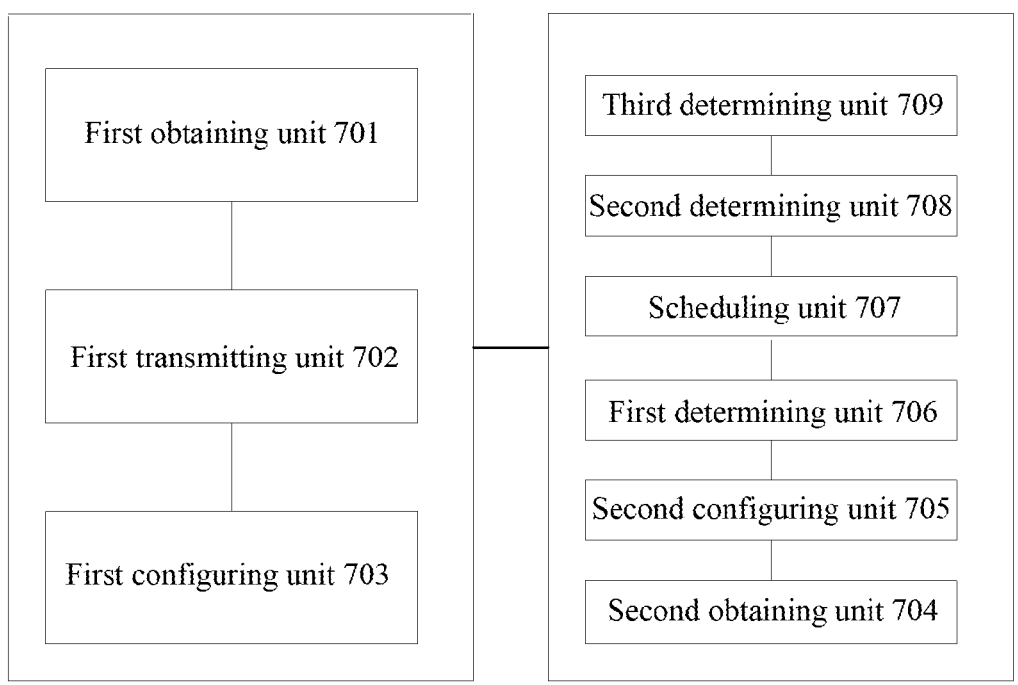
FIG. 7 is a schematic diagram of the composition of a data transmission device provided in an embodiment of the present document.

Based on the abovementioned data transmission method, the embodiment of the present document further provides a data transmission device applied in a transmission node, particularly the aforementioned first transmission node, as shown in FIG. 7, the device includes: first obtaining unit 701, first transmitting unit 702, and first configuring unit 703, herein, the first obtaining unit 701 is configured to obtain subframe types of subframes for bearing the data transmission;

the first transmitting unit 702 is configured to transmit data on the subframes according to the subframe types;

the first configuring unit 703 is configured to configure a conventional subframe corresponding to the conventional subframe type and a predefined subframe corresponding to the predefined subframe through at least one of the following: herein the subframe type includes at least a conventional subframe type and a predefined subframe type;

the first configuring unit 703 is configured to, when the subframe types at least includes the first predefined subframe type and the first conventional subframe type, configure a different value for an element in a transmission structures respectively used by the first predefined subframe and the first conventional subframe; the element includes one of the following: a data transmission mode, a cyclic prefix length, a number of orthogonal frequency division multiplexing (OFDM) symbols, subcarrier spacing, a resource unit of the data transmission;

the first configuring unit 703 is configured to, when the subframe types at least includes a second predefined subframe type and a second conventional subframe type, configure the second conventional subframe to be an uplink subframe or a downlink subframe within a preset time; configure the second predefined subframe to switch between the uplink and the downlink within the preset time;

the first configuring unit 703 is configured to, when the subframe types at least includes a third predefined subframe type and a third conventional subframe type, configure maximum transmission power of the third predefined subframe to be less than maximum transmission power of the third conventional subframe.

As shown in FIG. 7, the device further includes: second obtaining unit 704, configured to obtain relevant information related to the predefined subframe and/or physical control channel frequency domain location information of at least one fourth transmission node so that the first configuring unit 703 configures the predefined subframe.

Herein, the relevant information includes: time domain information of the predefined subframe, frequency domain information of the predefined subframe, information of a data type transmitted on the predefined subframe, switch information of a cell in which the fourth transmission node is located, the transmission power information used by the predefined subframe for transmitting the data, interference information interfering the predefined subframe, the data transmission mode used by the predefined subframe, the cyclic prefix length, the number of OFDM symbols included in the predefined subframe, subcarrier spacing, and the resource unit of data transmission.

The first transmitting unit 702 is further configured to transmit the configured configuration information of the predefined subframe to other transmission nodes, specifically the second transmission node, herein, the configuration information includes at least one of the following: time domain location information of the predefined subframe, data transmission structure, and maximum transmission power; herein, the first transmitting unit 702 is configured to transmit the configuration information of the predefined subframe to the second transmission node through a high layer signaling or a physical layer signaling.

As shown in FIG. 7, the device further includes: second configuring unit 705, configured to configure the maximum transmission power used by the predefined subframe for transmitting the data according to frequency point information and the system type of the system in which the predefined subframe is located;

the second configuring unit 705 is configured to, when the system in which the predefined subframe is located is the TDD system and the TDD system is working on the uplink frequency spectrum of the FDD system, configure the maximum transmission power for the TDD system to be less than the maximum transmission power of the downlink data of the TDD system in the TDD frequency spectrum;

the second configuring unit 705 is configured to, when the system in which the predefined subframe is located is the TDD system, and the frequency spectrum of the TDD system uses the full downlink data transmission, configure the maximum transmission power for the TDD system to be less than the maximum transmission power of the downlink data of the TDD system in the TDD frequency spectrum;

the second configuring unit 705 is configured to, when the system in which the predefined subframe is located is the FDD system and the FDD system is working on the frequency spectrum of the TDD system, configure the maximum transmission power for the FDD system to be less than the maximum transmission power of the data of the FDD system in the FDD downlink frequency spectrum;

the second configuring unit 705 is configured to, when the system in which the predefined subframe is located is the long term evolution (LTE) system and the LTE system is working in an unauthorized spectrum, configure the maximum transmission power for the LTE system to be less than the maximum transmission power of the LTE system in the LTE authorized spectrum.

As shown in FIG. 7, the device further includes: first determining unit 706, configured to determine the transmission power used by the predefined subframe for transmitting the data according to path loss information and/or interference information reported by the second transmission node;

correspondingly, the first transmitting unit 702 is configured to transmit the data with the transmission power on the predefined subframe.

In the abovementioned solution, the first transmitting unit 702 is further configured to, when transmitting the data on the predefined subframe by using the transmission method based on the user-specific reference signal, and the channel for bearing the data is the Physical Downlink Shared Channel (PDSCH);

when the predefined subframe for transmitting the data is the sounding reference signal (SRS) subframe, not transmit the data on the last OFDM symbol of the predefined subframe;

when the predefined subframe transmitting the data is the non-SRS subframe, transmit the data on the last OFDM symbol of the predefined subframe.

And/or, the first transmitting unit 702 is further configured to, when using the transmission mode based on the user-specific reference signal to transmit the data on the predefined subframe, and the channel used for carrying the data is the Physical Downlink Shared Channel (PDSCH) or the enhanced physical downlink control channel (ePDCCH), determine the starting time domain OFDM symbol of the PDSCH or the ePDCCH to be the first OFDM symbol of the predefined subframe.

As shown in FIG. 7, the device further includes: scheduling unit 707, configured to schedule the data through the control information;

the control information is located in a control channel used by the transmission frequency band where the predefined subframe is located; or the control information is located in a control channel used by a subframe having the same serial number as the predefined subframe in a transmission band corresponding to the transmission band; or, the control information is located at a position predetermined with the data; herein, the control channel includes at least one of the ePDCCH, the PUSCH, and the PDCCH.

As shown in FIG. 7, the device further includes: second determining unit 708, configured to determine the multiple access mode used for transmitting the data according to the frequency band resource where the data is located, or the type of the data, or the correspondence relationship of the uplink and downlink resources and the multiple access mode set by the data;

Correspondingly, the first transmitting unit 702 is configured to transmit the data in the multiple access mode on the predefined subframe.

As shown in FIG. 7, the device further includes: third determining unit 709, configured to determine the data transmission mode for the data according to the multiple access mode used by the data, or according to the type of the data, or according to the resource where the data is located or according to the correspondence relationship set between the data and the data transmission mode used by the data;

Correspondingly, the first transmitting unit 702 is configured to transmit the data with the data transmission mode on the predefined subframe.

It will be appreciated by those skilled in the art that the implementation functions of respective processing units in the data transmission device shown in FIG. 7 can be understood with reference to the related description of the aforementioned data transmission method. It will be understood by those skilled in the art that functions of the respective processing units in the data transmission device shown in FIG. 7 can be realized by programs running on a processor or by specific logic circuits.

In a practical application, the first obtaining unit 701, the first transmitting unit 702, the first configuring unit 703, the second obtaining unit 704, the second configuring unit 705, the first determining unit 706, the scheduling unit 707, the second determining unit 708 and the third determining unit 709 may be implemented by a central processing unit (CPU), a digital signal processor (DSP), a microprocessor (MPU), or a Field Programmable Gate Array (FPGA), and the like; and all the CPU, the DSP, the MPU, and the FPGA may be built in the first transmission node.

It should be noted that, in the embodiment of the present document, the first transmission node, the second transmission node, the third transmission node and the fourth transmission node may be a base station, a terminal, a wireless gateway, a router, a relay node, or the like.

The embodiment of the present document provides a first computer storage medium storing herein, the computer storage medium stores a first group of computer-executable commands for executing the aforementioned data transmission method applied in the first transmission node.

The embodiment of the present document provides a second computer storage medium, herein, the second computer stores a second group of computer-executable commands for executing the aforementioned data transmission method applied in the fourth transmission node.

The embodiment of the present document provides a third computer storage medium herein, the computer storage medium stores a third group of computer-executable commands for executing the aforementioned data transmission method applied in the second transmission node.

It will be appreciated by those skilled in the art that embodiments of the present document may be provided as a method, a system, or a computer program product. Thus, the present document may take the form of a hardware embodiment, a software embodiment, or an embodiment combining software and hardware aspects. Furthermore, embodiments of the present document may take the form of a computer program product implemented on one or more computer usable storage media (including but not limited to a magnetic disk storage and an optical storage, etc.) containing computer usable program code therein.

The present document is described with reference to flow charts and/or block diagrams of the method, device (system), and computer program product according to the embodiments of the present document. It should be understood that each process and/or block in a flowchart and/or block diagram, as well as combinations of processes and/or blocks in a flow chart and/or block diagram, may be implemented by computer program commands. These computer program commands may be provided to a processor of a general purpose computer, a special purpose computer, an embedded processor, or other programmable data processing device to produce a machine such that the commands executed by a computer or a processor of another programmable data processing device can be used to create an device for implementing the functions specified in one or more processes in the flow chart and/or one or more blocks in the block diagram.

The computer program commands may also be stored in a computer readable memory that is capable of directing a computer or other programmable data processing device to work in a particular manner such that the commands stored in the computer readable memory produce a product including the command means, the command device implements the functions specified in one or more processes in the flow chart and/or one or more blocks in the block diagram.

These computer program commands may also be loaded into a computer or other programmable data processing device such that a series of operational steps are executed on the computer or other programmable device to produce computer-implemented processing, so that the commands executed on the computer or the other programmable device are provided to implement the functions specified in one or more processes of the flow chart and/or one or more blocks in the block diagram.

The above description is only intended to be the embodiments of the present document and is not intended to limit the protection scope of the present document.

INDUSTRIAL APPLICABILITY

The embodiments of the present document provides the data transmission method, device and related computer storage medium herein, the method is applied to the first transmission node, including: obtaining the subframe types of the subframes for bearing the data transmission; the first transmission node transmitting the data on the subframe according to the subframe type; herein, the subframe type at least includes a conventional subframe type and a predefined subframe type, and a conventional subframe corresponding to a conventional subframe type and a predefined subframe type corresponding to the predefined subframe are configured through at least one of the following: when the subframe types at least includes a first predefined subframe type and a first conventional subframe type, configuring a different value for an element in a transmission structure respectively used by the first predefined subframe and the first conventional subframe; the element includes one of the following: a data transmission mode, a cyclic prefix length, a number of OFDM symbols, subcarrier spacing, a resource unit of data transmission; when the subframe types at least includes a second predefined subframe type and a second conventional subframe type, configuring the second conventional subframe to be an uplink subframe or a downlink subframe within the preset time; configuring the second predefined subframe to switch between the uplink and the downlink within the preset time; when the subframe types at least includes a third predefined subframe type and a third conventional subframe type, configuring the maximum transmission power of the third predefined subframe to be less than the maximum transmission power of the third conventional subframe. Using the predefined subframe can ensure improving the frequency spectral efficiency and reducing underutilized resources at the same time that the first transmission node transmits downlink data in the uplink frequency spectrum and/or transmits uplink data in the downlink frequency spectrum; at the same time, it solves the problem of interference in data transmission between adjacent transmission nodes and improves the system throughput.

What is claimed is:

1. A data transmission method, applied to a first transmission node, wherein the method comprises:
    obtaining subframe types of subframes for bearing data transmission;
    transmitting the data on the subframes according to the subframe types;
    wherein, the subframe types at least comprise a conventional subframe type and a predefined subframe type, and configuring a conventional subframe corresponding to the conventional subframe type and a predefined subframe corresponding to the predefined subframe type through at least one of the following:
    when the subframe types at least comprise a first predefined subframe type and a first conventional subframe type, configuring a different value for an element in a transmission structure respectively used by the first predefined subframe and the first conventional subframe; wherein the element comprises one of the following: a transmission mode of the data, a cyclic prefix length, a number of orthogonal frequency division multiplexing, OFDM, symbols, subcarrier spacing, and a resource unit of the data transmission;

when the subframe types at least comprise a second predefined subframe type and a second conventional subframe type, configuring the second conventional subframe to be an uplink subframe or a downlink subframe within preset time; configuring the second predefined subframe to switch between uplink and downlink within the preset time;

when the subframe types at least comprise a third predefined subframe type and a third conventional subframe type, configuring maximum transmission power of the third predefined subframe to be less than maximum transmission power of the third conventional subframe.

2. The method of claim 1, wherein, before obtaining subframe types of subframes for bearing data transmission, the method further comprises:

obtaining relevant information related to a predefined subframe and/or frequency domain location information of a physical control channel of at least one fourth transmission node to make the first transmission node configure the predefined subframe, wherein, the relevant information comprises at least one of the following:

time domain information of the predefined subframe, frequency domain information of the predefined subframe, information of a data type transmitted on the predefined subframe, switch information of a cell where the fourth transmission node is located, information of transmission power used for transmitting data on the predefined subframe, interference information interfering the predefined subframe, a data transmission mode used by the predefined subframe, a cyclic prefix length, the number of OFDM symbols included in the predefined subframe, subcarrier spacing, and a resource unit of the data transmission.

3. The method of claim 1, wherein, before a first transmission node transmitting data on the subframes according to the subframe types, the method further comprises:

the first transmission node transmitting configured configuration information of the predefined subframe to a second transmission node, wherein, the configuration information comprises at least one of: time domain location information, data transmission structure, and maximum transmission power of the predefined subframe.

4. The method of claim 3, wherein, the method further comprises:

the first transmission node transmitting the configuration information of the predefined subframe to the second transmission node through a high layer signaling or a physical layer signaling.

5. The method of claim 1, wherein, the method further comprises:

configuring the maximum transmission power used by the predefined subframe for transmitting the data according to frequency point information and a system type of a system where the predefined subframe is located;

wherein, when the system where the predefined subframe is located is a time division duplex, TDD, system and the TDD system is working on an uplink frequency spectrum in a frequency division duplex, FDD, system, the maximum transmission power configured for the TDD system is less than the maximum transmission power of the downlink data of the TDD system in the TDD spectrum;

when the system in which the predefined subframe is located is a TDD system and a frequency spectrum of the TDD system uses full downlink data transmission, maximum transmission power configured for the TDD system is less than maximum transmission power of downlink data of the TDD system in a TDD frequency spectrum;

when the system where the predefined subframe is located is an FDD system and the FDD system is working on a frequency spectrum of a TDD system, maximum transmission power configured for the FDD system is less than maximum transmission power of data of the FDD system in an FDD downlink frequency spectrum;

when the system where the predefined subframe is located is a long term evolution, LTE, system, and the LTE system is working on an unauthorized frequency spectrum, maximum transmission power configured for the LTE system is less than maximum transmission power of the LTE system in an LTE authorized frequency spectrum.

6. The method of claim 1, wherein, before the first transmission node transmitting data on the subframes according to the subframe types, the method further comprises:

determining transmission power used by the predefined subframe for transmitting the data according to path loss information and/or interference information reported by a second transmission node;

correspondingly, the first transmission node transmitting the data with the transmission power on the predefined subframe;

or wherein, after configuring the predefined subframe to switch between uplink and downlink within the time, the method further comprises:

when the data is transmitted on the predefined subframe by using a transmission mode based on a user-specific reference signal, and a channel for carrying the data is a physical downlink shared channel, PDSCH, when the predefined subframe on which the data is transmitted is a sounding reference signal, SRS, subframe, not transmitting the data on a last OFDM symbol of the predefined subframe;

when the predefined subframe on which the data is transmitted is a non-SRS subframe, transmitting the data on the last OFDM symbol of the predefined subframe;

or wherein, after configuring the predefined subframe to switch between uplink and downlink within the time, the method further comprises:

when the data is transmitted on the predefined subframe by using a transmission mode based on a user-specific reference signal, and a channel for carrying the data is a PDSCH, or an Enhanced Physical Downlink Control Channel, ePDCCH, determining a starting time-domain OFDM symbol of the PDSCH or the ePDCCH to be a first OFDM symbol of the predefined subframe.

7. The method of claim 1, wherein, before the first transmission node transmitting the data by using the subframes having the subframe types, the method comprises:

scheduling the data through control information;

wherein, the control information is located in a control channel used by a transmission frequency band where the predefined subframe is located; or the control information is located in a control channel used by a subframe having a same serial number as the predefined subframe in a transmission frequency band corresponding to the transmission frequency band; or, the control information is located at a position predetermined with the data.

8. The method of claim 1, wherein, before the first transmission node transmits data on the subframes according to the subframe types, the method further comprises:

determining a multiple access mode used for transmitting the data according to a frequency band resource where the data is located, or according to the type of the data, or according to a correspondence relationship between uplink and downlink resources and a multiple access mode set for the data;

correspondingly, the first transmission node transmitting the data on the predefined subframe with the multiple access mode.

9. The method of claim 1, wherein, the method further comprises:

determining a data transmission mode for the data according to a multiple access mode used by the data, or according to a type of the data, or according to a resource where the data is located, or according to a set correspondence relationship between the data and a data transmission mode used by the data;

correspondingly, the first transmission node transmitting the data with the data transmission mode on the predefined subframe.

10. A data transmission method, applied to at least one fourth transmission node, wherein the method comprises:

the at least one fourth transmission node sending relevant information related to subframe types of the fourth transmission node and/or physical control channel frequency domain location information of the fourth transmission node to a first transmission node;

wherein, the subframe types at least comprises a conventional subframe type and a predefined subframe type, configuring a conventional subframe corresponding to the conventional subframe type and a predefined subframe corresponding to the predefined subframe type comprise at least one of the following:

when the subframe types at least comprise a first predefined subframe type and a first conventional subframe type, configuring a different value for element in a transmission structure respectively used by the first predefined subframe and the first conventional subframe; wherein the element comprises one of the following: a transmission mode of the data, a cyclic prefix length, a number of orthogonal frequency division multiplexing, OFDM symbols, subcarrier spacing, and a resource unit of data transmission;

when the subframe types at least comprise a second predefined subframe type and a second conventional subframe type, configuring the second conventional subframe to be an uplink subframe or a downlink subframe within preset time; configuring the predefined subframe to switch between uplink and downlink within the preset time;

when the subframe types at least comprise a third predefined subframe type and a third conventional subframe type, configuring maximum transmission power of the third predefined subframe to be less than maximum transmission power of the third conventional subframe.

11. The method of claim 10, wherein, when the relevant information is relevant information of the predefined subframe type, the relevant information comprises at least one of the following:

time domain information of the predefined subframe, frequency domain information of the predefined subframe, information of a data type transmitted on the predefined subframe, switch information of a cell where the fourth transmission node is located, information of transmission power used by the predefined subframe for transmitting data, interference information interfering the predefined subframe, a data transmission mode used by the predefined subframe, a cyclic prefix length, a number of Orthogonal Frequency division multiplexing, OFDM symbols included in the predefined subframe, subcarrier spacing, and a resource unit of the data transmission.

12. A data transmission method, applied to a second transmission node, wherein the method comprises:

the second transmission node receiving information about a predefined subframe configured by a first transmission node;

wherein, subframe types at least comprise a conventional subframe type and a predefined subframe type, and a conventional subframe corresponding to the conventional subframe type and the predefined subframe corresponding to the predefined subframe type are configured through at least one of the following:

when the subframe types at least comprise a first predefined subframe type and a first conventional subframe type, configuring a different value for an element in a transmission structure respectively used by the first predefined subframe and the first conventional subframe; wherein the element comprises one of the following: a transmission mode of the data, a cyclic prefix length, a number of orthogonal frequency division multiplexing, OFDM, symbols, subcarrier spacing, and a resource unit of the data transmission;

when the subframe types at least comprise a second predefined subframe type and a second conventional subframe type, configuring the second conventional subframe to be an uplink subframe or a downlink subframe within preset time; configuring the second predefined subframe to switch between uplink and downlink within the preset time;

when the subframe types at least comprise a third predefined subframe type and a third conventional subframe type, configuring maximum transmission power of the third predefined subframe to be less than maximum transmission power of the third conventional subframe.

13. The method of claim 12, wherein, the method further comprises:

the second transmission node feeding path loss information and/or interference information back to the first transmission node.

14. A data transmission device, applied to a transmission node, wherein the device comprises a processor configured to execute instructions stored in a non-transitory storage medium to perform steps in following units:

a first obtaining unit, configured to obtain subframe types of subframes for bearing data transmission;

a first transmitting unit, configured to transmit data on the subframes according to the subframe types;

a first configuring unit, configured to configure a conventional subframe corresponding to a conventional subframe type and a predefined subframe corresponding to a predefined subframe type through at least one of the following: wherein, the subframe types at least comprises the conventional subframe type and the predefined subframe type;

the first configuring unit is configured to, when the subframe types at least comprise a first predefined subframe type and a first conventional subframe type, configure a different value for an element in a transmission structure respectively used by the first predefined subframe and the first conventional subframe; the element comprises one of the following: a transmission mode of the data, a cyclic prefix length, a number of orthogonal frequency division multiplexing, OFDM, symbols, subcarrier spacing, and a resource unit of the data transmission;

the first configuring unit is configured to, when the subframe types at least comprise a second predefined subframe type and a second conventional subframe type, configure the second conventional subframe to be an uplink subframe or a downlink subframe within preset time; configure the second predefined subframe to switch between uplink and downlink within the preset time;

the first configuring unit is configured to, when the subframe types at least comprise a third predefined subframe type and a third conventional subframe type, configure maximum transmission power of the third predefined subframe to be less than maximum transmission power of the third conventional subframe.

15. The device of claim 14, wherein, the processor is further configured to execute instructions stored in the non-transitory storage medium to perform steps in a following unit: a second obtaining unit, configured to obtain relevant information related to the predefined subframe of and/or physical control channel frequency domain location information of at least one fourth transmission node to make the first configuring unit configure the predefined subframe, wherein, the relevant information comprises:

time domain information of the predefined subframe, frequency domain information of the predefined subframe, information of a data type transmitted on the predefined subframe, switch information of a cell where the fourth transmission node is located, information of transmission power used by the predefined subframe for transmitting the data, interference information interfering the predefined subframe, a data transmission mode used by the predefined subframe, a cyclic prefix length, a number of OFDM symbols included in the predefined subframe, subcarrier spacing, and a resource unit of the data transmission.

16. The device of claim 14, wherein,
the first transmitting unit is further configured to transmit configured configuration information of the predefined subframe to other transmission nodes,
wherein, the configuration information comprises at least one of the following: time domain location information, a data transmission structure, and maximum transmission power of the predefined subframe,
the first transmitting unit is configured to transmit the configuration information of the predefined subframe to the other transmission nodes through a high layer signaling or a physical layer signaling.

17. The device of claim 14, wherein, the processor is further configured to execute instructions stored in the non-transitory storage medium to perform steps in a following unit: a second configuring unit, configured to configure the maximum transmission power used by the predefined subframe for transmitting the data according to frequency point information and a system type of a system where the predefined subframe is located;

wherein, the second configuring unit is configured to, when the system where the predefined subframe is located is a time division duplex, TDD, system, and the TDD system is working on a uplink frequency spectrum of a frequency division duplex, FDD, system, configure maximum transmission power for the TDD system to be less than maximum transmission power of downlink data of the TDD system in a TDD frequency spectrum;

the second configuring unit is configured to, when the system where the predefined subframe is located is a TDD system, and a frequency spectrum of the TDD system uses full downlink data transmission, configure maximum transmission power for the TDD system to be less than the maximum transmission power of the downlink data of the TDD system in the TDD frequency spectrum;

the second configuring unit is configured to, when the system where the predefined subframe is located is an FDD system, and the FDD system is working on a frequency spectrum of a TDD system, configure maximum transmission power for the FDD system to be less than maximum transmission power of data of the FDD system in a FDD downlink frequency spectrum;

the second configuring unit is configured to, when the system where the predefined subframe is located is a long term evolution, LTE, system, and the LTE system is working on an unauthorized spectrum, configure maximum transmission power for the LTE system to be less than maximum transmission power of the LTE system in an LTE authorized frequency spectrum.

18. The device of claim 14, wherein, the processor is further configured to execute instructions stored in the non-transitory storage medium to perform steps in a following unit: a first determining unit, configured to determine transmission power used by the predefined subframe for transmitting the data based on path loss information and/or interference information reported by a second transmission node;

correspondingly, the first transmitting unit is configured to transmit the data with the transmission power on the predefined subframe;

or the first transmitting unit is further configured to, when transmitting the data on the predefined subframe by using a transmission mode based on a user-specific reference signal and a channel for bearing the data is a Physical Downlink Shared Channel, PDSCH;

when the predefined subframe on which the data is transmitted is a sounding reference signal, SRS, subframe, not transmit the data on a last OFDM symbol of the predefined subframe;

when the predefined subframe on which the data is transmitted is a non-SRS subframe, transmit the data on the last OFDM symbol of the predefined subframe;

or the first transmitting unit is further configured to, when the data is transmitted on the predefined subframe by using the transmission mode based on the user-specific reference signal, and a channel used for bearing the data is a PDSCH or an enhanced physical downlink control channel, ePDCCH, determine a starting time domain OFDM symbol of the PDSCH or the ePDCCH to be a first OFDM symbol of the predefined subframe.

19. The device of claim 14, wherein, the processor is further configured to execute instructions stored in the non-transitory storage medium to perform steps in a following unit: a scheduling unit, configured to schedule the data through control information;

wherein, the control information is located in a control channel used by a transmission frequency band where the predefined subframe is located; or the control information is located in a control channel used by a subframe having a same serial number as the predefined subframe in a transmission frequency band corresponding to the transmission band; or, the control information is located at a position predetermined with the data.

20. The device of claim 14, wherein, the processor is further configured to execute instructions stored in the non-transitory storage medium to perform steps in a following unit: a second determining unit, configured to determine a multiple access mode used for transmitting the data according to a band frequency resource where the data is located, or the type of the data, or according to a correspondence relationship between uplink and downlink resources and the multiple access mode set for the data;

correspondingly, the first transmitting unit is configured to transmit the data in the multiple access mode on the predefined subframe;

or the processor is further configured to execute instructions stored in the non-transitory storage medium to perform steps in a following unit: a third determining unit, configured to determine a data transmission mode for the data according a multiple access mode used by the data, or according to a type of the data, or according to a resource where the data is located or according to a set correspondence relationship between the data and a data transmission mode used by the data;

correspondingly, the first transmitting unit is configured to transmit the data with the data transmission mode on the predefined subframe.

* * * * *